United States Patent [19]
Frencken et al.

[11] Patent Number: 4,926,260
[45] Date of Patent: May 15, 1990

[54] VIDEO SIGNAL PROCESSING CIRCUIT

[75] Inventors: Peter H. Frencken; Antonius H. H. J. Nillesen; Simon J. Brand, all of Eindhoven, Netherlands

[73] Assignee: U.S. Philips Corporation, New York, N.Y.

[21] Appl. No.: 345,394

[22] Filed: May 1, 1989

[30] Foreign Application Priority Data

Jun. 2, 1988 [NL] Netherlands ............... 8801415

[51] Int. Cl.$^5$ .................................... H04N 5/04
[52] U.S. Cl. ........................... 358/148; 358/158; 358/320; 358/329; 358/337; 360/75; 360/36.1; 375/120
[58] Field of Search ............... 358/148, 158, 320, 321, 358/322, 329, 337, 338, 342; 360/36.1, 75; 369/47; 375/118, 119, 120; 455/306; 331/1 R, 20

[56] References Cited

U.S. PATENT DOCUMENTS

| Re. 31,326 | 7/1983 | Amery et al. | 358/322 |
| 4,195,309 | 3/1980 | Christopher et al. | 358/329 |
| 4,740,944 | 4/1988 | Verboom | 369/47 |
| 4,851,910 | 7/1989 | Kawai et al. | 358/158 |

Primary Examiner—John W. Shepperd
Assistant Examiner—Michael D. Parker
Attorney, Agent, or Firm—Edward W. Goodman

[57] ABSTRACT

In order that one clock signal generator in a digital video signal processing circuit comprising a line-coupled clock signal generator and using, for example one or more field memories is sufficient for writing and reading these memories and can still process a signal from a video recorder, the control loop of the clock signal generator uses a comb filter circuit which rapidly corrects regular variations in an output signal of a phase detector of the control loop, which variations are caused by the head drum of the video recorder, without having to adapt the proportioning of a conventional loop filter circuit.

3 Claims, 1 Drawing Sheet

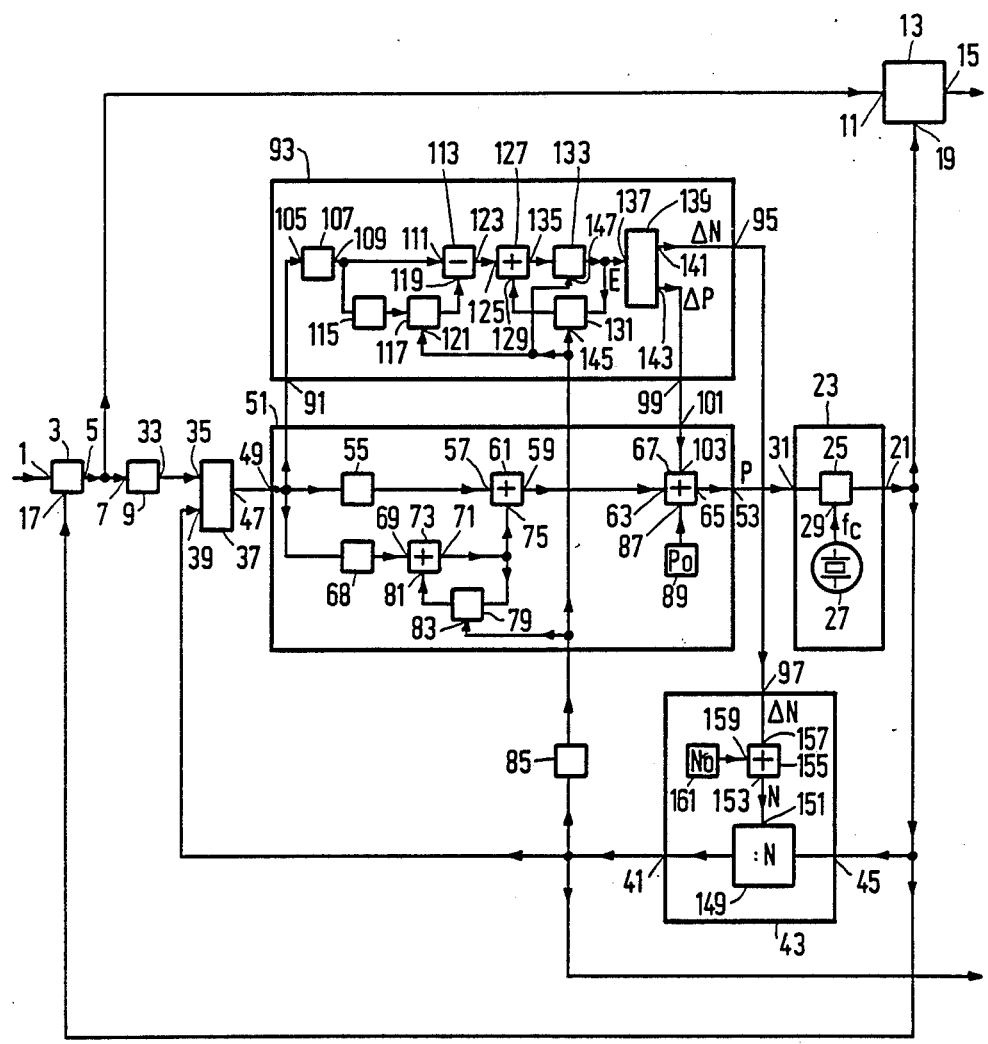

VIDEO SIGNAL PROCESSING CIRCUIT

BACKGROUND OF THE INVENTION

The invention relates to a video signal processing circuit including a clock signal generating circuit which comprises a phase detector having a first input for a line synchronizing signal, a second input which is coupled to an output of a clock signal generator at least via a frequency divider and a control signal output which is coupled to a control signal input of the clock signal generator.

A video signal processing circuit of the type described above is known from European Patent Specification 70465 and it comprises a memory circuit which is used to increase the field frequency of the video signal. The memory circuit is written and read by means of clock signals which are derived from a clock signal generated by a single clock signal generator. If such a video signal processing circuit must be used for processing video signals from a video recorder, it is found to be difficult to obtain a satisfactory filtering of the output signal of the phase detector by using conventional loop filter circuits.

It is an object of the invention to provide a solution to this problem.

SUMMARY OF THE INVENTION

According to the invention a video signal processing circuit of the type described in the opening paragraph is therefore characterized in that the signal path between the control signal output of the phase detector and the second input thereof incorporate a comb filter circuit by which the phase of a signal applied to the second input of the phase detector is is controlled faster for jumps in an output signal of the phase detector at a frequency to which the comb filter circuit is tuned than for jumps in said output signal at different frequencies.

The Applicant has found that deviations in the line-synchronizing signal pattern of a video signal supplied by a video recorder mainly occur at a frequency which is determined by the rotational speed of the head drum of the video recorder. These deviations can be considered as phase jumps which occur at that frequency with respect to an average phase. These phase jumps produce a jump component of the said frequency at the output of the phase detector which component is passed by the comb filter circuit and ensures a fast correction of the phase of the signal at the second input of the phase detector. A conventional loop filter having a sufficiently large time constant can then be used for correcting slow variations so that a control circuit which is insensitive to disturbances is obtained for the clock signal generator.

BRIEF DESCRIPTION OF THE DRAWING

The invention will now be described in greater detail with reference to the drawing comprising only one FIGURE which shows a concise block diagram of a possible embodiment of a video signal processing circuit according to the invention.

DESCRIPTION OF THE PREFERRED EMBODIMENT

In the FIGURE a video signal to be processed is applied to an input 1 of an analog-to-digital converter 3. A digitized video signal is obtained from an output 5 of the analog-to-digital converter 3 and this signal is applied to an input 7 of a synchronizing signal separating circuit 9 and to an input 11 of a memory circuit 13. The memory circuit 13 may be used, for example, for field frequency doubling or noise suppression and supplies a video signal processed in the manner indicated from an output 15.

Clock signal inputs 17 and 19 of the analog-to-digital converter 3 and the memory circuit 13, respectively, receive a clock signal from an output 21 of a clock signal generator 23, which clock signal is generated by a digital oscillator 25 which is, for example of an accumulator type. A crystal oscillator 27 applies a signal at a frequency $f_c$ to an input 29 of the digital oscillator 25, which signal delays an output signal from a modulo-one adder (not shown) of the digital oscillator 25 by a period $1/f_c$ and applies it to an input of said adder while another input thereof receives the signal with a value p applied to a control signal input 31 of the clock signal generator 23. The clock signal at the output 21 of the clock signal generator 23 occurs whenever the modulo-one adder has reached its final value of one and thus has a frequency of $p.f_c$.

An output 33 of the synchronizing signal separating circuit 9 applies a line synchronizing signal to a first input 35 of a phase detector 37. A second input 39 of the phase detector 37 receives a signal having a frequency $pf_c/N$ from an output 41 of a frequency divider 43, an input 45 of which is connected to the output 21 of the clock signal generator 23.

A control signal output 47 of the phase detector 37 applies the output signal of the phase detector to an input 49 of a loop filter circuit 51. An output 53 of the loop filter circuit 51 applies the previously mentioned signal value p to the input 31 of the clock signal generator 23.

The loop filter circuit 51 which may be, for example of a conventional type, comprises a proportional signal path from the input 49 via an attenuator 55, an input 57 and an output 59 of an adder 61 and an input 63 and an output 65 of an adder 67 to the output 53 and furthermore comprises an integrating signal path from the input 49 via an attenuator 68, an input 69 and an output 71 of an adder 73, a further input 75 and the output 59 of the adder 61 and the input 63 and the output 65 of the adder 67 to the output 53. The integrating operation is obtained by a coupling of the output 71 of the adder 73 via a delay circuit 79 which has a delay of one line period, to a further input 81 of the adder 73. A clock signal input 83 of the delay circuit 79 is connected to the output 41 of the frequency divider 43 via a delay circuit 85 having a delay of slightly more than a quarter of one line period, for example 19 μsec for a television system having a line period of 64 μsec. A further input 87 of the counter 67 receives a digital signal value $p_o$ from a nominal value generator 89, which value determines the nominal frequency of the clock signal generator 23.

The control signal output 47 of the phase detector 37 is also connected to an input 91 of a comb filter circuit 93 which for amplitude variations of a frequency determined by the rotational speed of a head drum of a video recorder, for example 25 Hz for most video recorders for the above-mentioned television system and the harmonics thereof passes on these amplitude variations for a part $\Delta N$ in an adapted manner to an output 95 which is connected to a division factor correction signal input 97 of the frequency divider 43 and which passes on the rest $\Delta p$ to an output 99 which is connected to a correction signal input 101 of the loop filter circuit 51 which is connected to a third input 103 of the adder 67.

The input 91 of the comb filter circuit 93 is connected to an input 105 of an attenuator 107 having a transmission factor which for reasons of stability is taken to be, for example slightly smaller than that of the attenuator 55 of the proportional signal path of the loop filter circuit 51. An output 109 of the attenuator 107 is connected to a non-inverting input 111 of a subtractor circuit 113 and to an inverting input 119 of the subtractor circuit 113 via an attenuator 115 having a transmission factor of, for example one minus the sum of the transmission factors of the attenuators 55 and 68, and a delay circuit 117 having a delay of one line period. A clock signal input 121 of the delay circuit 117 is connected to the delay circuit 85.

The subtractor circuit 113 supplies at its output 123 a signal in which the ringing effects due to the loop filter circuit 51 are substantially suppressed so as to prevent these effects from having a long-lasting effect via the comb filter circuit 93 on the control of the clock signal generator 23.

The output 123 of the subtractor circuit 113 is connected to an input 125 of an adder 127, a further input 129 of which is connected to an output 135 thereof via a delay circuit 131 having a delay of one line period and a delay circuit 133 having a delay of one picture period minus one line period in this case because the head drum makes one revolution per picture period. The connection of the delay circuits 131 and 133 is connected to an input 137 of an adapting circuit 139, an output 141 of which supplies the value $\Delta N$ and an output 143 of which supplies the value $\Delta p$ to the outputs 95 and 99, respectively of the comb filter circuit 93. The delay circuits 131 and 133 have clock signal inputs 145 and 147, respectively which are connected to the delay circuit 85.

In the frequency divider 43 a counter circuit 149 is incorporated between the input 45 and the output 41, which circuit is loaded each time via an input 151 with a value N and then counts down to a value of zero. This value N is obtained at an output 153 of an adder 155 an input 157 of which receives the value $\Delta N$ from the division factor correction signal input 97 and an input 159 of which receives a value $N_o$ from a nominal division factor generator 161, which value is the nominal division factor of the frequency divider 43.

Since the value $N = N_o + \Delta N$ must be an integer, the matching circuit 139 of the comb filter circuit 93 is formed in such a way than $\Delta N$ is always an integer having a value which is derived from an error value E occurring at the input 137 of the matching circuit 139. This error value E is split up into two parts e and $\Delta p$ for which it holds that $E = e + \Delta p$ in which e is chosen to be as close as possible to the value E and is further equal to $-p_o \Delta N / N$. The residual value $\Delta p = E - e$ is applied to the correction signal input 101 of the loop filter circuit 51.

This is based on the recognition that the variations of the error value E passed on by the comb filter circuit 93 are caused by regularly occurring phase jumps in the signal at the input 35 of the phase detector 37, which jumps actually do not relate to a variation of the frequency of this signal and which can therefore be best corrected by the frequency divider 43. The loop filter circuit 51 corrects the frequency of the clock signal generator 23.

It will be evident that, although a very favourable control is given in this example, for example the error value E can be applied, if desired, either completely or for a different part than has been indicated to either the loop filter circuit 51 or the frequency divider 43.

For the sake of clarity the different signal paths in the drawing are illustrated by means of a single connection but in reality the number of connections may of course be adapted to the number of bits to be transferred of a digital signal value occurring therein.

By using the comb filter circuit 93 the loop filter circuit 51 can now be proportioned for an optimum interference suppression, whilst a fast control of phase jumps caused by the head drum of a video recorder is nevertheless obtained.

What is claimed is:

1. A video signal processing circuit including a clock signal generating circuit which comprises a phase detector having a first input for a line-synchronizing signal, a second input which is coupled to an output of a clock signal generator at least via a frequency divider and a control signal output which is coupled to a control signal input of the clock signal generator, characterized in that the signal path between the control signal output of the phase detector and the second input thereof incorporates a comb filter circuit by which the phase of a signal applied to the second input of the phase detector is controlled faster for jumps in an output signal of the phase detector at a frequency to which the comb filter circuit is tuned than for jumps in said output signal at different frequencies.

2. A video signal processing circuit as claimed in claim 1, characterized in that an output of the comb filter circuit is coupled to a division factor correction signal input of the frequency divider.

3. A video signal processing circuit as claimed in claim 2, in which the control signal input of the clock signal generator is coupled to the control signal output of the phase detector via a loop filter circuit comprising a parallel arrangement of a proportional and an integrating signal path, characterized in that a correction signal input of the loop filter circuit is coupled to an output of the comb filter circuit.

* * * * *